Aug. 17, 1954  J. E. HALL, SR., ET AL  2,686,358
PROTECTOR REMOVER
Filed March 25, 1950  2 Sheets-Sheet 1

INVENTOR.
Jesse E. Hall, Sr.
Jesse E. Hall, Jr.
BY Thos. E. Scofield
ATTORNEY.

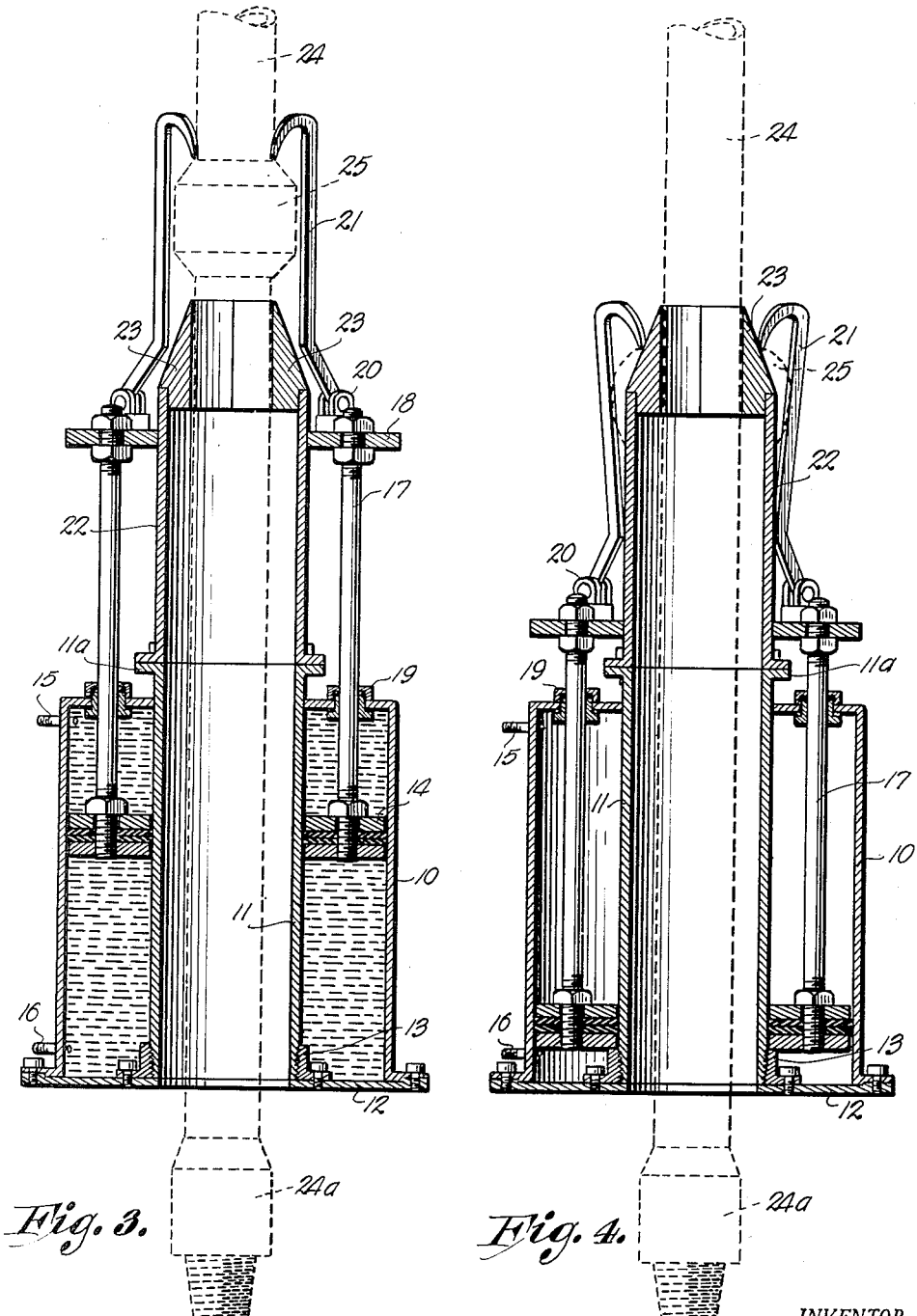

Patented Aug. 17, 1954

2,686,358

UNITED STATES PATENT OFFICE 2,686,358

PROTECTOR REMOVER

Jesse E. Hall, Sr., and Jesse E. Hall, Jr.,
Weatherford, Tex.

Application March 25, 1950, Serial No. 151,838

4 Claims. (Cl. 29—236)

1

This invention relates to improvements in a protector remover and refers more particularly to a hydraulic tool for the removal of drill pipe protectors from drill pipe.

Heretofore, many types of applicator tools have been devised to stretch the rubber protectors used on drill pipe and make application of the protectors to the pipe, but few tools have been devised for the removal of the protectors once they have been mounted on the pipe. In the drilling of oil wells where a drilling contractor is employed to drill a well and the company furnishes protectors for the drill pipe, the loss of protectors when the well has been completed and the pipe is removed constitutes an item of considerable expense. If the protectors can be removed from the pipe without damage and reused, the loss of the protectors may be avoided.

The salient features of novelty in the tool reside in the use of an annular hydraulic cylinder and piston arrangement with a tubular passageway axially of the cylinder through which the drill pipe is run. Attached to the piston and reciprocable therewith are gripping elements and a backing plate, the gripping elements adapted to engage a rim of the protector and slide it along the pipe onto a carrier or transfer sleeve after which the protector is pushed from the sleeve by the backing plate upon reciprocation of the piston in the opposite direction.

An object, therefore, of the invention is to provide a hydraulic tool adapted to be mounted in a vertical position above the rotary table of the derrick, or horizontally upon a cradle located conveniently to the pipe rack.

Another object is to provide a hydraulic tool through which a drill pipe may be run and the protectors on the pipe slid from the pipe to a transfer or carrier sleeve with the aid of a hydraulic piston.

A further object is to provide a hydraulic tool for removing drill pipe protectors which is positive in its action, a machine by which protectors can be removed from the drill pipe rapidly with little likelihood of damage and a device that can easily be manipulated by a single unskilled operator.

Further objects and advantages will be evident from the specification which follows.

In the accompanying drawings which form a part of the specification and are to be read in conjunction therewith, and in which like reference numerals are used to indicate like parts in the various views:

Fig. 3 is a view taken along the line 3—3 in Fig. 1, in the direction of the arrows.

Fig. 4 is a sectional view taken along the same line as Fig. 3 with the annular piston in a lowered position and the protector being transferred from the pipe to the carrier sleeve.

Figure 1:
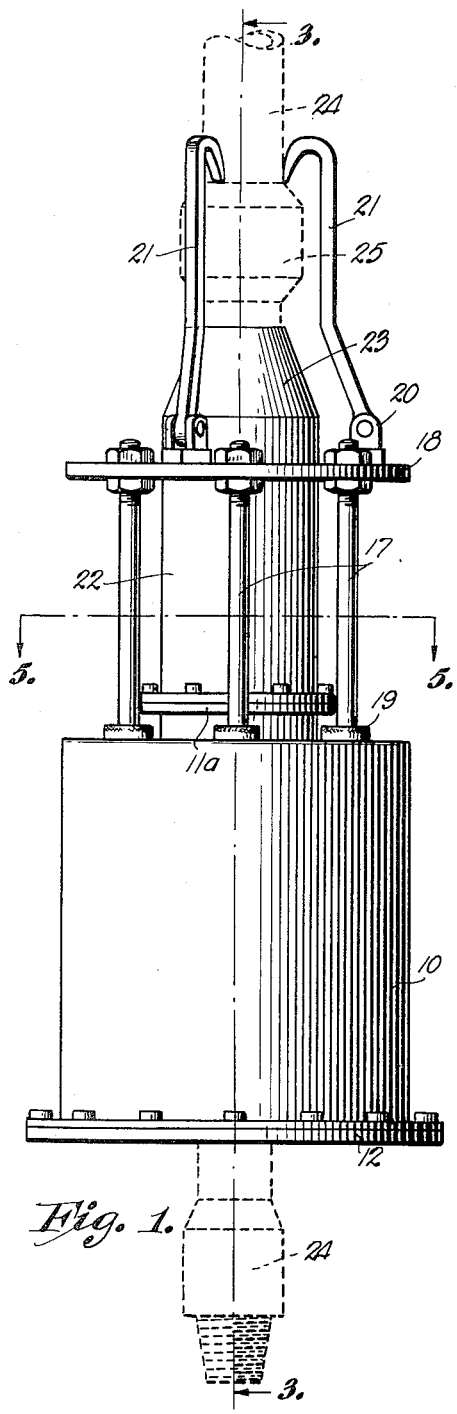
Fig. 1 is a side elevational view of the tool with a portion of one section of drill pipe shown in dotted lines, and a protector about to be removed.
Figure 6:
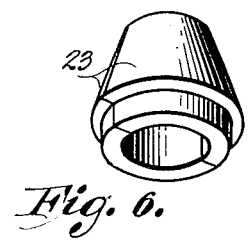
Fig. 6 is a perspective view of the split conical sleeve which facilitates transfer of the protector from the pipe to the sleeve.
Figure 5:
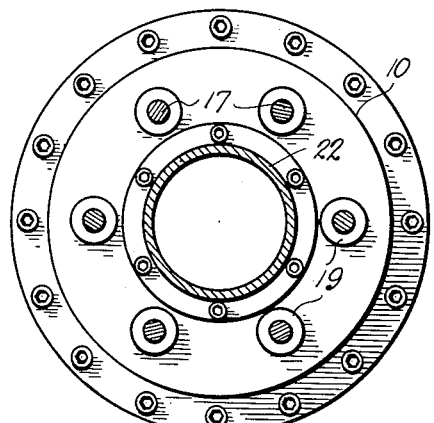
Fig. 5 is a view taken along the line 5—5 in Fig. 1, in the direction of the arrows.
Figure 2:
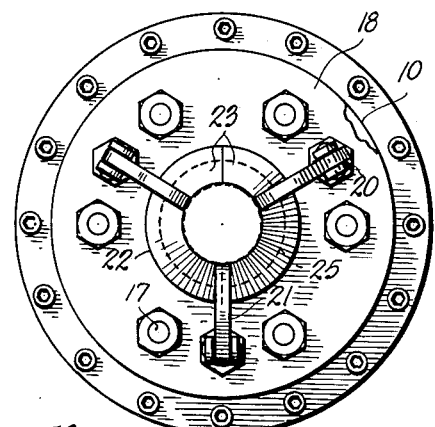
Fig. 2 is a top plan view of the tool shown in Fig. 1.

Referring to the drawings, at 10 is shown an annular hydraulic cylinder through which extends a tubular member 11. Cylinder 10 has a lower flange to which is bolted an annular bottom plate 12. A retainer collar 13 bolted to the bottom plate is internally threaded to receive the threaded end of the tubular member 11. Reciprocable in the cylinder 10 is an annular piston 14. Hydraulic fluid may be introduced above and below the piston through pipes 15 and 16 and in order to reciprocate the piston suitable valves are provided, but not shown, to admit and discharge hydraulic fluid to and from the cylinder to cause it to reciprocate. Attached to the piston at one of their ends are a plurality of connecting rods 17, the opposite ends of the rods are rigidly attached to an annular plate 18 located outside of the hydraulic cylinder. Loss of fluid from the top of the cylinder around the rods is prevented by stuffing boxes 19.

Pivoted between the ears of fittings 20 are grappling hooks 21. These hooks are arranged equidistant around the pipe and usually three or four are sufficient to properly engage a rim of the protector and to stretch it sufficiently so it may be slid along the pipe. Tube 11 extending through the hydraulic cylinder 10 is flanged a short distance above the top of the cylinder, as shown at 11a, and to its flange is bolted the transfer or carrier sleeve 22. Into the top of the carrier sleeve is fitted a split conical sleeve 23 shouldered adjacent its larger end to fit on the top of the sleeve. The length of the hooks 21, connecting rods 17, the length of the stroke of piston 14 and positioning of the annular plate with respect to the transfer sleeve 22, are designed to position a section of drill pipe properly, as shown in dotted lines at 24. The tool joint 24a at the lower end of the pipe is run through the tubular member 11 to a position shown in Fig. 1.

The piston is raised so hooks 21 grip beneath a rim of the protector and slide the protector from the pipe to the transfer sleeve when the piston is returned to its down position. The function of the split conical sleeve 23 is to permit free passage of the pipe joint 24a when the cone is removed and to fit closely against the exterior of the pipe during transfer of the protector from the pipe to the sleeve, thereby not only aiding in positioning the pipe within the tool, but facilitating sliding of the protector onto the transfer sleeve.

In operation, if a protector is to be removed from a section of drill pipe, the tool may be mounted on the rotary table in an upright position with the bottom of the tool rigidly fixed to the table. Hooks 21 are thrown back and the split conical sleeve 23 removed from the top of the transfer sleeve 22. The section of drill pipe is lowered into tube 11 and split cone 23 is fitted into the top of the transfer sleeve immediately below the protector to be removed. Hydraulic fluid is admitted below the piston to raise it to its uppermost position. The hooks 21 are swung against the pipe to engage the upper rim of the protector. The pipe at this time is supported within the derrick with the protector just above the split cone, or in a position shown in Figs. 1 and 3. The valve in the hydraulic system is then shifted and fluid is admitted above the piston and discharged from the cylinder below the piston. The piston moves downwardly to a position shown in Fig. 4 at which time the hooks engaging the upper rim of the protector have slid it from the pipe over the cone and onto the transfer sleeve. The hooks are then raised slightly and swung back after which cone 23 is again removed and the drill pipe raised out of the tube 11. To remove the protector from the sleeve, it is only necessary to shift the valve in the hydraulic system and again reciprocate the piston upwardly. With its upward movement the piston slides annular plate 18 along the carrier sleeve in a reverse direction, pushing the protector from the sleeve in its travel. The protectors, after removal from the sleeve, may again be applied to drill pipe by a separate applicator tool, which is an operation entirely separate and distinct from that described herein.

In removing the protector from a section of drill pipe in the operation just described, the tool was mounted on the rotary table of the derrick. It is contemplated as well to mount the tool horizontally on a cradle located conveniently to the pipe rack and slide the drill pipe into the end of the tool while supporting the pipe on uprights equipped with rollers upon which the pipe is easily shifted horizontally. The cradle which carries the tool may be mounted on a stationary foundation or on the rear of a truck, so long as it is sufficiently stable to bear the weight of both the tool and the section of pipe.

Thus it will be seen there has been provided a tool for removing drill pipe protectors adapted to slide the protectors with a single stroke of a hydraulic piston from the pipe to a transfer sleeve. There has been provided a rugged mechanism in which may be handled sections of drill pipe with a single operator and the protectors removed from the pipe section with little or no manual labor.

From the foregoing it will be seen that this invention is one well adapted to attain all of the ends and objects hereinabove set forth together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In a device for removing an elastic protective collar from a drill pipe, a rigid tube adapted to be advanced axially over the pipe to a point adjacent the collar, the bore of said tube being larger in diameter than the exterior of the collar when the latter is mounted on the drill pipe, a sleeve encircling the drill pipe between the end of said tube and said collar, the exterior of said sleeve being tapered axially with its large end seated against the tube and its small end adjacent the collar, a ring encircling said tube and movable axially thereof, hook members on the ring extending longitudinally of the drill pipe over the protector and adapted to engage the rim of the protector farthest from said sleeve, power means for moving said ring axially of the tube in a direction to cause the said hook members to draw the protector over said tapered sleeve onto said tube, said power means also operable at will to move said ring axially of the tube in the opposite direction, and said ring effective upon said last movement to engage the collar and push same from the tube.

2. A device as in claim 1 wherein said tapered sleeve is split axially to form a plurality of separable parts, thereby to facilitate assembly of the sleeve around the drill pipe between the tube and collar.

3. In a device for removing an elastic protective collar from a drill pipe, a rigid tube adapted to be advanced axially over the pipe to a point adjacent the collar, the bore of said tube being larger in diameter than the exterior of the collar when the latter is mounted on the drill pipe, a split sleeve adapted to closely embrace the drill pipe between the end of said tube and said collar, the exterior of said sleeve being tapered axially with its large end seated against the tube and its small end adjacent the collar, said sleeve having at its large end a continuous neck portion of reduced diameter projecting into the tube around the drill pipe, a ring encircling the tube and movable axially thereof, hook members on the ring extending longitudinally of the drill pipe over the protector and adapted to engage the rim of the protector farthest from the sleeve, power means for moving said ring axially of the tube in a direction to cause said hook members to draw the protector over said tapered sleeve onto said tube, said power means also operable at will to move said ring axially of the tube in the opposite direction, and said ring effective upon said last movement to engage the collar and push same from the tube.

4. In a drill pipe protector remover, an annular fluid cylinder with an annular piston axially reciprocable therein, said piston subdividing the cylinder into two compartments, means for admitting pressure fluid to either compartment selectively to forcibly shift the piston axially of the cylinder in either direction, said cylinder having an unobstructed bore materially larger in diameter than the outside diameter of the pipe from which the protector is to be removed, a carrier sleeve projecting from one end of the cylinder and forming a continuation of the bore thereof, a split collar constructed to closely embrace the drill pipe and seat on the end of the sleeve, the exterior of said collar tapering axially from the sleeve to a thin annular edge closely encircling said pipe, a ring encircling said sleeve and connected to said piston to move therewith axially of the sleeve, a plurality of elongate swingable members hinged to said ring at circumferentially spaced points, said members being of a length exceeding the axial length of the protector to be removed and having at their free ends hooks adapted to engage one end of the protector whereby upon movement of the piston in one direction, the protector is drawn by said hooks over said collar and onto said sleeve, said ring effective upon movement of the piston in the opposite direction to engage the opposite end of the protector and push same from the sleeve.

References Cited in the file of this patent

UNITED STATES PATENTS

| Number | Name | Date |
| --- | --- | --- |
| 1,581,057 | Hill | Apr. 13, 1926 |
| 1,772,447 | Affolter | Aug. 12, 1930 |
| 2,252,692 | Barnes et al. | Aug. 19, 1941 |
| 2,291,251 | Norris | July 28, 1942 |
| 2,327,088 | Barnes | Aug. 17, 1943 |
| 2,328,771 | Barnes et al. | Sept. 7, 1943 |